US012548387B2

(12) United States Patent
Bross et al.

(10) Patent No.: US 12,548,387 B2
(45) Date of Patent: Feb. 10, 2026

(54) METHOD, APPARATUS, AND COMPUTER-READABLE STORAGE MEDIUM FOR DETERMINING DEFECTIVE VEHICLES

(71) Applicant: Bayerische Motoren Werke Aktiengesellschaft, Munich (DE)

(72) Inventors: Marco Bross, Sao Paulo (BR); Markus Frank, Munich (DE); Florian Eberl, Fraunberg (DE); Julia Hollmayer-Lahrsow, Ratzenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 18/557,525

(22) PCT Filed: Feb. 7, 2022

(86) PCT No.: PCT/EP2022/052918
§ 371 (c)(1),
(2) Date: Oct. 26, 2023

(87) PCT Pub. No.: WO2022/242921
PCT Pub. Date: Nov. 24, 2022

(65) Prior Publication Data
US 2024/0265751 A1    Aug. 8, 2024

(30) Foreign Application Priority Data
May 17, 2021  (DE) .................... 10 2021 112 661.4

(51) Int. Cl.
G07C 5/08    (2006.01)
(52) U.S. Cl.
CPC ................................ G07C 5/0808 (2013.01)

(58) Field of Classification Search
CPC .......... G07C 5/0808; G05B 2219/2637; G05B 19/0428
See application file for complete search history.

(56) References Cited

U.S. PATENT DOCUMENTS

2018/0295147 A1   10/2018   Haga et al.
2020/0274729 A1   8/2020   Takada et al.

FOREIGN PATENT DOCUMENTS

DE   102005001390 A1   7/2006
DE   102013203943 A1   9/2014
(Continued)

OTHER PUBLICATIONS

Machine Translation (Year: 2013).*
(Continued)

Primary Examiner — Michael V Kerrigan
(74) Attorney, Agent, or Firm — Maginot, Moore & Beck LLP

(57) ABSTRACT

A method determines defective vehicles, wherein the defective vehicles are a subset of vehicles and the vehicles are divided into a plurality of vehicle types. Then method includes providing an expected value of a number of predefined messages to be sent for each vehicle type, and determining an actual value of a number of predefined messages sent for each vehicle. The method also includes determining a deviation value for each vehicle, wherein each deviation value is representative of a difference between the actual value for the vehicle and the expected value for a corresponding vehicle type. The method further includes determining a defective subgroup of defective vehicles depending on the deviation values, wherein the actual value for each vehicle of the defective subgroup is different from the expected value for each corresponding vehicle type.

18 Claims, 2 Drawing Sheets

(56) References Cited

FOREIGN PATENT DOCUMENTS

DE   102013107962 A1   1/2015
DE   102018213010 A1   2/2020
DE   102019125077 A1   3/2021

OTHER PUBLICATIONS

International Search Report corresponding to International Patent Application No. PCT/EP2022/052918, dated Jun. 14, 2022 (4 pages).
Written Opinion corresponding to International Patent Application No. PCT/EP2022/052918, dated Jun. 14, 2022 (5 pages).
German Search Report corresponding to German Patent Application No. 10 2021 112 661.4, dated Nov. 4, 2021. (7 pages).

* cited by examiner

METHOD, APPARATUS, AND COMPUTER-READABLE STORAGE MEDIUM FOR DETERMINING DEFECTIVE VEHICLES

The present application is the U.S. national phase of PCT Application PCT/EP2022/052918 filed on Feb. 7, 2022, which claims priority of German patent application No. 102021112661.4 filed on May 17, 2021, which is incorporated herein by reference in its entirety.

TECHNICAL FIELD

The present disclosure relates generally to the determination of defective vehicles, and methods, apparatus and computer-readable memory media therefor.

BACKGROUND

One object to be achieved is to specify a method with which defective vehicles are determined particularly easily and quickly. In addition, an apparatus and a computer program are to be specified that are able to carry out such a method. In addition, a computer-readable memory medium with such a computer program is to be specified.

SUMMARY

These objects are achieved by advantageous designs, implementations and developments disclosed and claimed herein.

First, the method for determining defective vehicles is explained. The defective vehicles are a subset of vehicles. For example, the vehicles form a total quantity, wherein the vehicles of the total quantity are networked with each other, for example. The vehicles are, for example, networked by means of an apparatus. For example, each of the vehicles is connected to the apparatus, in particular an external apparatus, by means of a communication link. The apparatus is, for example, a server, especially a backend server.

The vehicles are divided into a plurality of vehicle types. For example, the vehicle type is a type designation of the vehicle. For example, each vehicle type includes a plurality of the vehicles. For example, vehicles included in one vehicle type are not included in another vehicle type. For example, the vehicle types group the vehicles.

According to at least one implementation of the method, an expected value of a number of predefined messages to be sent per vehicle type is provided. For example, the expected value is the average value of the number of predefined messages to be sent per vehicle type. For example, the expected values are determined before provision. This means that the expected values are determined, for example, before the method is carried out. For example, the expected value is calculated on the basis of a brief historical past, for example the last 4 weeks or the last 12 weeks, before the method is carried out. Advantageously, the expected value is therefore not static, but can change dynamically.

According to at least one implementation of the method, an actual value of a number of predefined messages sent will be determined for each vehicle. For example, the actual values are determined as a function of a time interval. For example, the time interval is at least 1 hour and at most 48 hours, especially 24 hours. In particular, the time interval is representative of a day of the week.

For example, the predefined messages sent for each vehicle during operation of the vehicle are sent to the external apparatus, where they are stored and processed, for example. For example, for the determination of the actual values the predefined messages sent for each vehicle are processed within the time interval. For example, the actual values are a number of predefined messages sent within the time interval.

For example, the predefined messages to be sent and/or the predefined messages sent are messages containing status data of the respective vehicles. If a vehicle is being operated, for example, this vehicle sends a predefined message containing the status data to the external apparatus. For example, the status data are data of the vehicle that are displayed to a user in the vehicle and/or on a mobile apparatus.

According to at least one implementation of the method, a deviation value is determined for each vehicle, wherein each deviation is representative of a difference of the actual value and the expected value. For example, each vehicle has a deviation value.

Furthermore, each vehicle has at least one property in addition to the deviation value, for example. The property includes, for example, one of the following information items: vehicle type, product update, software version, combination of control units, assigned domestic market, back-end hub, production date. For example, the vehicles have at least some of the same properties.

For example, the information including the product update indicates what kind of updates a vehicle software, in particular control software, includes. Similarly, the information including the software version indicates the status of the vehicle software, in particular the control software. The information including the combination of control units indicates, for example, which control units are installed in the vehicle and/or which control units communicate with each other. The information including the assigned domestic market indicates in which geographical region the vehicle is mainly operated. The information including the back-end hub indicates the external back-end hub to which the vehicle is connected.

According to at least one implementation of the method a defective subgroup of defective vehicles is determined depending on the deviation values. The defective subgroup includes, for example, defective vehicles for which the deviation values are comparatively large.

According to at least one implementation of the method, the actual value of the defective subgroup is different from the expected value.

For example, the defective subgroup includes defective vehicles sending particularly few predefined messages compared to the number of predefined messages to be sent. This means that the defective vehicles of the defective subgroup send comparatively few messages. In this case, the actual value of the defective subgroup is smaller than the expected value.

Alternatively, the actual value may be greater than the expected value. For example, in this case, the defective vehicles send more predefined messages.

For example, the actual value of the defective subgroup is at least two standard deviations greater or smaller than the expected value.

With such a method, a defective subgroup containing defective vehicles can be determined particularly easily and quickly. These defective vehicles have common properties that are responsible for a defect, for example.

For example, if the defect affects only a subset of the vehicles, in particular, a subset of connected vehicles of a fleet, then the defective subgroup can be identified by the specified method. This defective subgroup includes, for example, defective vehicles that only have certain vehicle types of a backend hub with a certain software version and/or a certain production date.

This means that the properties of the defective vehicles are known and targeted remedial measures can be initiated.

According to at least one implementation of the method, when the expected value is provided, in each case a standard deviation of the number of predefined messages to be sent per vehicle type is provided. In particular, when providing an expected value, a standard deviation of the number of predefined messages to be sent per vehicle type is provided.

Alternatively, when providing the expected value, in addition a range of the number of predefined messages to be sent for each vehicle type is provided. For example, the range corresponds to a distance of the 20% percentile from the 80% percentile of the expected value.

According to at least one implementation of the method, each deviation value is representative of a number of standard deviations of the expected value.

According to at least one implementation of the method, each expected value is calculated as a function of multiple time intervals and the time intervals are each representative of a day of the week. For example, each day of the week is assigned a single expected value for each vehicle type, in particular a single expected value and a single standard deviation.

According to at least one implementation of the method, when the defective subgroup is determined a global median is determined, which is representative of all deviation values of the vehicles. In particular, the global median is a median of all deviation values.

According to at least one implementation of the method, when the defective subgroup is determined at least a first subgroup is determined depending on a first property.

According to at least one implementation of the method, the at least one first subgroup has a first median that has a maximum difference from the global median.

According to at least one implementation of the method, when the defective subgroup is determined at least a second subgroup and at least a third subgroup are generated from the at least one first subgroup.

According to at least one implementation of the method, the at least one second subgroup has a second median depending on a second property.

According to at least one implementation of the method, the at least one third subgroup has a third median depending on a third property.

According to at least one implementation of the method, a difference between the second median and the third median is maximized.

For example, further subgroups are created from the at least one second subgroup and/or the at least one third subgroup depending on further properties.

According to at least one implementation of the method, the defective subgroup is determined depending on predefined population size of the second subgroup and the third subgroup.

For example, the predefined population size is a termination criterion of the method. In this case, the defective subgroup is formed by the subgroup that is smaller than the predefined population size. The predefined population size of the defective subgroup is predefined depending on a statistical relevance. For example, the predefined population size is so large that no overadjustment is generated. For example, the predefined population size of the predefined subgroup contains at least 500 vehicles and not more than 5000 vehicles.

If a population size of the first subgroup and/or the second group is larger than the predefined population size, then further subgroups are created from the second subgroup and/or the third subgroup. The method is terminated, for example, if a population size of at least one of the other subgroups is smaller than the predefined population size.

According to at least one implementation of the method, the first, the second and the third properties each include at least one of the following information items: vehicle type, product update, software version, combination of control units, assigned domestic market, back-end hub, production date. If further subgroups are created, the other properties also include one of the aforementioned information items.

According to at least one implementation of the method the first, the second and the third properties differ from each other. In particular, the other properties also differ from each other when generating the other subgroups.

Furthermore, an apparatus for determining defective vehicles is specified. The apparatus is designed to carry out the method described herein. All features of the implementation disclosed in connection with the method are therefore also disclosed in connection with the apparatus and vice versa.

In addition, a computer program is specified containing commands which, when the computer program is executed by a computer, cause this to carry out the method described herein.

Furthermore, a computer-readable memory medium is specified on which the computer program described here is stored.

Exemplary embodiments are explained in more detail below by means of the schematic drawings.

DETAILED DESCRIPTION

Figure 1:
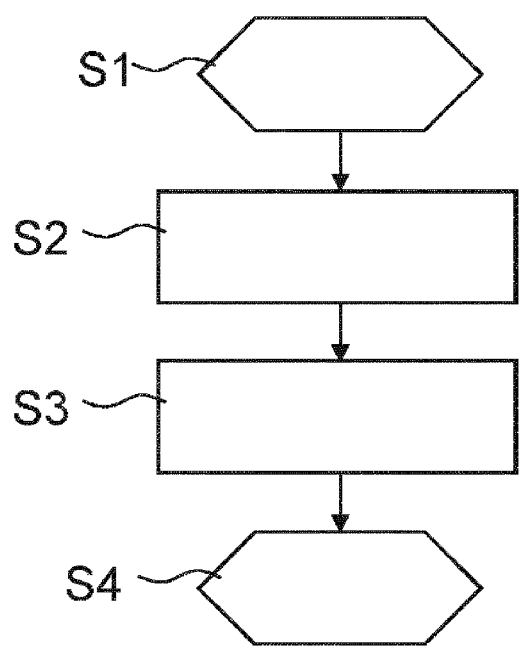
FIG. 1 shows a flowchart of a method according to an exemplary implementation.

In the flow diagram of the method according to the exemplary implementation of FIG. 1, a step S1 of the method is first executed, in which an expected value of a number of predefined messages to be sent per vehicle type is provided.

For example, each vehicle 2 of a networked vehicle fleet is designed to send messages during operation. These messages are predefined messages and contain, for example, status data of the respective vehicle 2. For each vehicle type, an expected value can be formed that contains a number of predefined messages to be sent, wherein the predefined messages to be sent are each representative of a vehicle type. Furthermore, the expected value includes the number of predefined messages to be sent within a day of the week.

The generation of the expected values can take place before the determination of a defective subgroup of the vehicles 2.

In a subsequent step S2 of the method, an actual value of a number of predefined messages sent for each vehicle 2 is determined.

For example, each vehicle 2 in operation sends the predefined messages to an apparatus 1, in particular an external apparatus, where these predefined messages are stored. For example, the number of predefined messages sent within a day of the week that correspond to the actual value is determined.

In the further step S3 of the method, a deviation value is subsequently determined for each vehicle 2, wherein each deviation value is representative of a difference between the actual value and the expected value. This means that the number of predefined messages to be sent within a day of the week is determined by the number of predefined messages sent within a day of the week, in particular the same day of the week.

Subsequently, in a step S4 of the method, a defective subgroup of defective vehicles is determined depending on the deviation values, wherein the actual value of the defective subgroup is smaller than the expected value. The defective vehicles each have at least one property, wherein this property is the same. If the number of predefined messages sent within a day of the week is significantly smaller than the number of predefined messages to be sent within the day of the week, especially the same day of the week, there is an increased chance that a defect will be induced due to the property.

Figure 2:
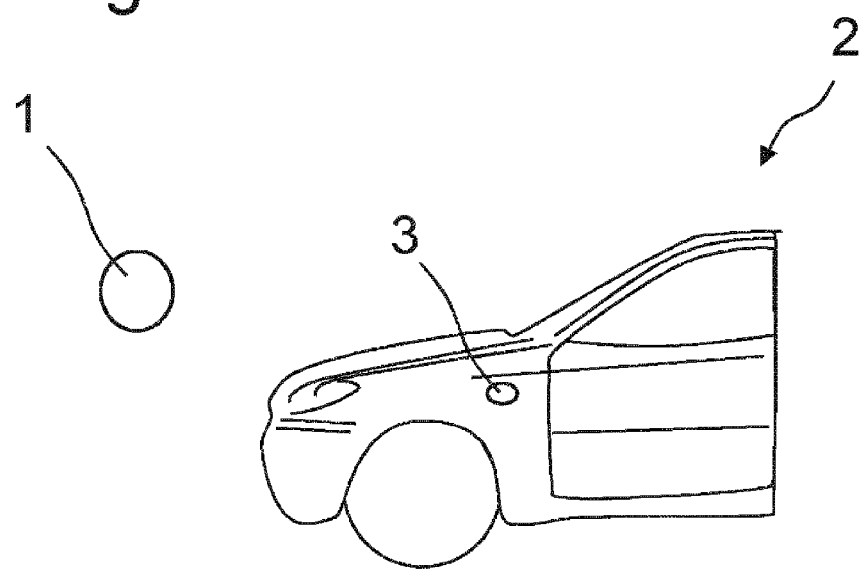
FIG. 2 shows a schematic representation of a system with an apparatus according to an exemplary implementation.

The system according to the exemplary implementation of FIG. 2 contains an apparatus 1, in particular an external apparatus, which is designed to be connected to a vehicle 2 via a communication link 3. The communication link 3 is designed to transmit the predefined messages that have been sent to the apparatus 1.

The apparatus 1 is designed to carry out the method according to FIG. 1.

For example, the apparatus is formed in a backend server.

For this purpose, the apparatus 1 has in particular a computing unit, a program and a data memory, as well as for example, one or more communication interfaces. The program and data memory and/or the computing unit and/or the communication interfaces may be formed in one unit and/or distributed over multiple units.

For the execution of the method, in particular a program for the determination of defective vehicles is stored on the program and data memory of the apparatus 1, which processes the method described above.

Figure 3:
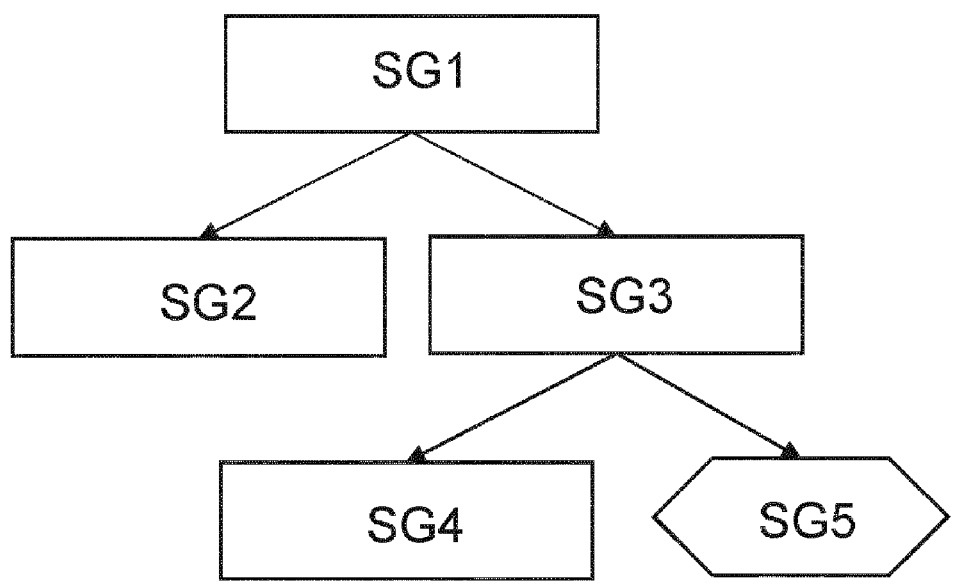
FIG. 3 shows a schematic representation of the determination of a defective subgroup with the method according to an exemplary implementation.

According to FIG. 3, a first subgroup SG1 is first determined depending on a first property. For example, the first property is information about a first product update. All vehicles with this property are included in the first subgroup SG1.

In particular, the first subgroup SG1 has a first median that has a maximum difference from a global median, wherein the global median is representative of all deviation values of the vehicles 2. For example, the first subgroup SG1 contains 600000 vehicles.

Subsequently, a second subgroup SG2 and a third subgroup SG3 are generated from the first subgroup SG1. The second subgroup SG2 includes, for example, the vehicles of the first subgroup SG1 for which the actual value corresponds to the expected value. The third subgroup SG3 includes for example, the vehicles of the first subgroup SG1 for which the actual value is different from the expected value.

The second subgroup SG2 includes vehicles depending on a second property. The second property is information about a second product update, for example. All vehicles of the second subgroup SG2 thus include vehicles with the first property and the second property. In addition, the second subgroup SG2 has a second median.

The third subgroup SG3 includes vehicles depending on a third property. The third property is, for example, information related to a domestic market. All vehicles of the third subgroup SG3 thus include vehicles with the first property and the third property. In addition, the third subgroup SG3 has a third median.

Here the second subgroup SG2 and the third subgroup SG3 are selected in such a way that a difference between the second median and the third median is maximized.

Subsequently, further subgroups are generated from the third subgroup SG3 depending on other properties, namely a fourth subgroup SG4 and a fifth subgroup SG5. The fourth subgroup SG4 includes, for example, the vehicles of the third subgroup SG3 for which the actual value corresponds to the expected value. The fifth subgroup SG5 includes, for example, the vehicles of the first subgroup SG1 for which the actual value is different from the expected value. For example, the fifth subgroup SG5 contains only 15000 vehicles.

This fifth subgroup SG5 corresponds to the defective subgroup of defective vehicles according to the method in conjunction with the exemplary implementation in FIG. 1.

REFERENCE SIGN LIST 1 apparatus
2 vehicle
3 communication apparatus
SG1 first subgroup
SG2 second subgroup
SG3 third subgroup
SG4 fourth subgroup
SG5 fifth subgroup
S1 . . . S4 step of the method

The invention claimed is:

1. A method for the determination of defective vehicles, wherein the defective vehicles are a subset of vehicles and the vehicles are divided into a plurality of vehicle types, the method comprising:
providing an expected value of a number of predefined messages to be sent for each vehicle type,
determining an actual value of a number of predefined messages sent for each vehicle,
determining a deviation value for each vehicle, wherein each deviation value is representative of a difference between the actual value for the vehicle and the expected value for a corresponding vehicle type, and
determining a defective subgroup of vehicles depending on the deviation values, wherein the actual value for each vehicle of the defective subgroup is different from the expected value for each corresponding vehicle type.

2. The method as claimed in claim 1, wherein providing the expected value of the number of predefined messages for at least one vehicle type further comprises providing a standard deviation of the number of predefined messages to be sent for the at least one vehicle type.

3. The method as claimed in claim 2, wherein each deviation value is representative of a plurality of standard deviations of the expected value.

4. The method as claimed in claim 2, wherein determining the defective subgroup of vehicles depending on the deviation values further comprises determining the defective subgroup such that the actual value of each vehicle of the defective subgroup is more than one standard deviation greater or smaller than the expected value.

5. The method as claimed in claim 4, wherein each expected value is determined depending on multiple time intervals, wherein each time interval is representative of a day of a week.

6. The method as claimed in claim 5, wherein when the defective subgroup of vehicles is determined,
   a global median is determined which is representative of all the deviation values of the vehicles,
   at least a first subgroup of vehicles is determined depending on a first property, wherein:
      deviation values of the first subgroup of vehicles define a first median that has a maximum difference from the global median, and
   at least a second subgroup of vehicles and at least a third subgroup of vehicles are generated from the at least one first subgroup of vehicles, wherein:
      deviation values of the second subgroup of vehicles define a second median depending on a second property,
      deviation values of the third subgroup of vehicles define a third median depending on a third property, and
      a difference between the second median and the third median is maximized.

7. The method as claimed in claim 6, wherein:
   each of the first, the second and the third properties include at least one of the group consisting of: vehicle type, product update, software version, combination of control units, assigned domestic market, back-end hub, and production date, and
   the first, the second and the third properties are each different from each other.

8. The method as claimed in claim 4, wherein when the defective subgroup of vehicles is determined,
   a global median is determined which is representative of all the deviation values of the vehicles,
   at least a first subgroup of vehicles is determined depending on a first property, wherein:
      deviation values of the first subgroup of vehicles define a first median that has a maximum difference from the global median, and
   at least a second subgroup of vehicles and at least a third subgroup of vehicles are generated from the at least one first subgroup of vehicles, wherein:
      deviation values of the second subgroup of vehicles define a second median depending on a second property,
      deviation values of the third subgroup of vehicles define a third median depending on a third property, and
      a difference between the second median and the third median is maximized.

9. The method as claimed in claim 8, wherein:
   each of the first, the second and the third properties include at least one of the group consisting of: vehicle type, product update, software version, combination of control units, assigned domestic market, back-end hub, and production date, and
   the first, the second and the third properties are each different from each other.

10. The method as claimed in claim 1, wherein each expected value is determined depending on multiple time intervals, wherein each time interval is representative of a day of a week.

11. The method as claimed in claim 10, wherein when the defective subgroup is determined,
   a global median is determined which is representative of all the deviation values of the vehicles,
   at least a first subgroup of vehicles is determined depending on a first property, wherein:
      deviation values of the first subgroup of vehicles define a first median that has a maximum difference from the global median, and
   at least a second subgroup of vehicles and at least a third subgroup of vehicles are generated from the at least one first subgroup of vehicles, wherein:
      deviation values of the second subgroup of vehicles define a second median depending on a second property,
      deviation values of the third subgroup of vehicles define a third median depending on a third property, and
      a difference between the second median and the third median is maximized.

12. The method as claimed in claim 11, wherein:
   each of the first, the second and the third properties include at least one of the group consisting of: vehicle type, product update, software version, combination of control units, assigned domestic market, back-end hub, and production date, and
   the first, the second and the third properties are each different from each other.

13. The method as claimed in claim 1, wherein when the defective subgroup of vehicles is determined,
   a global median is determined which is representative of all the deviation values of the vehicles,
   at least a first subgroup of vehicles is determined depending on a first property, wherein:
      deviation values of the first subgroup of vehicles define a first median that has a maximum difference from the global median, and
   at least a second subgroup of vehicles and at least a third subgroup of vehicles are generated from the at least one first subgroup of vehicles, wherein:
      deviation values of the second subgroup of vehicles define a second median depending on a second property,
      deviation values of the third subgroup of vehicles define a third median depending on a third property, and
      a difference between the second median and the third median is maximized.

14. The method as claimed in claim 13, wherein the defective subgroup of vehicles is determined depending on a predefined population size of the second subgroup of vehicles and the third subgroup of vehicles.

15. The method as claimed in claim 14, wherein:
   each of the first, the second and the third properties include at least one of the group consisting of: vehicle type, product update, software version, combination of control units, assigned domestic market, back-end hub, and production date, and
   the first, the second and the third properties are each different from each other.

16. The method as claimed in claim 13, wherein:
   each of the first, the second and the third properties include at least one of the group consisting of: vehicle type, product update, software version, combination of control units, assigned domestic market, back-end hub, and production date, and the first, the second and the third properties are each different from each other.

17. An apparatus for the determination of defective vehicles, which is designed to carry out the method as claimed in claim 1.

18. A non-transitory computer-readable memory medium storing instructions which, when executed by a computer, cause the computer to carry out the method as claimed in claim 1.

* * * * *